(12) United States Patent
Henson

(10) Patent No.: US 11,026,413 B2
(45) Date of Patent: Jun. 8, 2021

(54) THERAPEUTIC HORSESHOE AND METHOD OF USE

(71) Applicant: Riley Henson, Bloomfield, NM (US)

(72) Inventor: Riley Henson, Bloomfield, NM (US)

(*) Notice: Subject to any disclaimer, the term of this patent is extended or adjusted under 35 U.S.C. 154(b) by 0 days.

(21) Appl. No.: 16/800,443

(22) Filed: Feb. 25, 2020

(65) Prior Publication Data
US 2021/0120799 A1    Apr. 29, 2021

Related U.S. Application Data

(60) Provisional application No. 62/926,877, filed on Oct. 28, 2019.

(51) Int. Cl.
*A01L 1/00* (2006.01)
*A01L 3/00* (2006.01)

(52) U.S. Cl.
CPC .. *A01L 1/00* (2013.01); *A01L 3/00* (2013.01)

(58) Field of Classification Search
CPC ..... A01L 1/00; A01L 1/02; A01L 1/04; A01L 3/00; A01L 3/02; A01L 5/00
See application file for complete search history.

(56) References Cited

U.S. PATENT DOCUMENTS

| | | | |
|---|---|---|---|
| 1,442,748 A * | 1/1923 | Trauger | A01L 1/04 168/28 |
| 2,296,111 A * | 9/1942 | Mahar | A01L 1/04 168/28 |
| 4,346,762 A * | 8/1982 | Tovim | A01L 3/02 168/17 |
| 4,573,538 A * | 3/1986 | Figueras | A01L 7/02 168/14 |
| 4,605,071 A * | 8/1986 | McKibben | A01L 7/02 168/12 |
| 4,819,731 A * | 4/1989 | Stubbe | A01L 3/00 168/4 |
| 5,027,904 A * | 7/1991 | Miller | A01L 7/04 168/33 |
| 5,213,163 A * | 5/1993 | Schaffer | A01L 3/02 168/4 |

(Continued)

FOREIGN PATENT DOCUMENTS

| | | | | |
|---|---|---|---|---|
| EP | 2910216 A1 * | 8/2015 | ............. | A01L 15/00 |
| EP | 3114928 A1 * | 1/2017 | ............. | A01L 15/00 |

(Continued)

*Primary Examiner* — Kathleen I Alker
(74) *Attorney, Agent, or Firm* — Schmeiser, Olsen & Watts LLP

(57) ABSTRACT

A therapeutic horseshoe may be a unitary body having opposed upper and lower surfaces. The lower surface may be curved, such that the horseshoe is thicker in the middle and heel portions thereof and thinner at the inner and outer sides and, in some embodiments, the toe portions thereof, which allows a horse with navicular syndrome to easily roll the hoof laterally and medially and, in some embodiments, breakover the hoof sooner in the gait, to obtain comfort and pain relief, promoting increased blood flow and healing. At least one tab may be removably attached at various locations to the lower surface for customizing points of pressure to the hoof as well as customizing restriction of lateral and/or medial rolling of the hoof. A method of using a therapeutic horseshoe is also disclosed.

20 Claims, 16 Drawing Sheets

(56) References Cited

U.S. PATENT DOCUMENTS

| | | | | |
|---|---|---|---|---|
| 5,421,415 A * | 6/1995 | Wells | A01L 1/04 | 168/24 |
| 5,727,633 A * | 3/1998 | Ovnicek | A01L 7/02 | 168/24 |
| 5,740,865 A * | 4/1998 | Turk | A01L 1/04 | 168/4 |
| 8,220,231 B2 * | 7/2012 | Ruetenik | A01K 13/007 | 168/18 |
| 8,505,270 B2 * | 8/2013 | D'Arpe | A01L 15/00 | 168/2 |
| 9,770,018 B2 * | 9/2017 | Ruetenik | A01L 7/02 | |
| 9,781,913 B2 * | 10/2017 | Burns | A01L 5/00 | |
| 10,292,872 B2 * | 5/2019 | Ruetenik | A61F 13/043 | |
| 2006/0021758 A1 * | 2/2006 | Ovnicek | A01L 7/02 | 168/4 |
| 2006/0207772 A1 * | 9/2006 | Justis | A01L 5/00 | 168/4 |
| 2011/0067366 A1 * | 3/2011 | Ruetenik | A01L 15/00 | 54/82 |
| 2014/0231100 A1 * | 8/2014 | Ford | A01L 1/02 | 168/12 |
| 2016/0029609 A1 * | 2/2016 | MacDonald | A01L 3/00 | 168/18 |
| 2017/0027150 A1 * | 2/2017 | Ruetenik | A01L 15/00 | |
| 2017/0208792 A1 * | 7/2017 | Gomes Oliveira | A01L 1/02 | |
| 2019/0069514 A1 * | 3/2019 | Ruetenik | A01L 5/00 | |

FOREIGN PATENT DOCUMENTS

| | | | | |
|---|---|---|---|---|
| GB | 191319425 A * | 2/1914 | | A01L 7/02 |
| GB | 194435 A * | 3/1923 | | A01L 5/00 |

* cited by examiner

THERAPEUTIC HORSESHOE AND METHOD OF USE

CROSS REFERENCE TO RELATED APPLICATION

This application claims priority to U.S. Provisional Patent Application to Riley Henson entitled "THERAPEUTIC HORSESHOE," Ser. No. 62/926,877, filed Oct. 28, 2019, the disclosures of which are hereby incorporated entirely herein by reference.

BACKGROUND OF THE INVENTION

Technical Field

This invention relates generally to horseshoes, and particularly to a therapeutic horseshoe for treating horses with navicular syndrome.

State of the Art

Lameness is a common problem in many horses. Lameness may be manifest as an abnormal gait or stance of a horse resulting from dysfunction of the locomotor system. It is most commonly caused by pain but can be due to neurologic or mechanical dysfunction. The leading causes of equine lameness are diseases and injuries involving the lower leg and foot. Horses can suffer disease at an early age, but most equine lameness occurs in mature athletes in the prime of their useful careers. Lameness is one of the costliest health problems for the equine industry, both monetarily for the cost of diagnosis and treatment, and for the cost of time off resulting in loss-of-use of a horse.

Navicular syndrome, also known as navicular disease, is a term that has been used to describe pain in the palmar hoof that may be caused by damage to any of the structures within the hoof, including the navicular bone, the navicular bursa, the coffin joint, the deep digital flexor tendon, and various ligamentous supportive structures. Lameness characterized as navicular syndrome may begin as mild and intermittent, and progress to severe, due to strain and inflammation of the ligaments supporting the navicular bone, reduced blood flow and increased pressure within the hoof, damage to the navicular bursa or DDF tendon, or from cartilage erosion. Affected horses may display a "tiptoe" gait—trying to walk on the toes due to heel pain. They may stumble frequently and/or shift weight from one leg to another in an attempt to alleviate pain.

By the time a horse with navicular syndrome is consistently lame, and often by the time a horse is diagnosed, degenerative changes in the horse's feet are usually quite advanced and are traditionally believed to be non-reversible. Thus, conventional treatments have been relegated to managing the condition, with focus on alleviating pain and slowing the degeneration. Conventional treatments may include hoof trimming and hoof care, with focus on proper hoof shape and angle and may include corrective shoeing or removing shoes altogether. Other conventional treatments may include exercise, use of medications to increase blood flow and/or reduce pain, and/or surgery, such as to sever palmar digital nerves to relieve sensation of pain in the back of the foot. Millions of dollars are spent, annually, in diagnosing and treating navicular syndrome. However, none of these treatments has been successful to reverse navicular syndrome and restore pain-free use of the feet of a horse.

Accordingly, there is a need for an improved means of treating horses with navicular syndrome.

SUMMARY OF THE INVENTION

The present invention relates to horseshoes, and particularly to a therapeutic horseshoe for treating horses with navicular syndrome.

A therapeutic horseshoe may comprise a unitary body having opposed upper and lower surfaces and, as viewed from the top, a generally rounded contour at the side and toe portions thereof, and the contour being flat across the heel portion thereof. The upper surface may be flat and/or otherwise configured to engage the flat bottom of the wall of a hoof of a horse when installed thereto. The lower surface may be curved, such that the horseshoe is thicker in the middle and heel portions thereof and thinner at the inner and outer sides and toe portions thereof.

Because a therapeutic horseshoe is thicker in the middle portion and thinner on the inner and outer sides, this allows a horse that is shod with a therapeutic horseshoe to easily roll the hoof laterally and medially to obtain comfort and pain relief. This, in turn, promotes better blood circulation throughout the hoof and the tissues of the lower leg of the horse, relieves tension, and promotes healing.

In addition, in some embodiments, the lower surface of the therapeutic horseshoe may be rounded in a convex fashion near the front toe portion thereof, such that the breakover point is set back a distance behind the toe of the hoof. This causes breakover to occur earlier in the gait and reduces the force needed to breakover the hoof. The reduction in force needed to breakover the hoof tends to alleviate stress in the muscles and tendons of the lower leg, which further results in increased blood flow, pain reduction, and healing.

Some embodiments of a therapeutic horseshoe may comprise at least one tab removably coupled to the lower surface thereof. Such tabs may be added or removed, in any combination. Where a tab is coupled to the lower surface of a therapeutic horseshoe, it provides a location of additional pressure to the bottom of the horse's hoof, due to the added thickness of the horseshoe at the location of the tab. In some embodiments, a tab may also provide additional traction. A farrier may thus be able to customize a therapeutic horseshoe, by coupling at least one tab, or combination of tabs, at strategic locations on the lower surface of the horseshoe. In this manner, the farrier may be able to provide added pressure, and or various levels of stability, to the bottom of the hoof of a horse, at strategic locations.

A method of using a therapeutic horseshoe is also disclosed.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate to horseshoes, and particularly to a therapeutic horseshoe for treating horses with navicular syndrome.

When a hoof of a horse is resting on the ground, with or without a traditional horseshoe, the bottom of the hoof, or traditional shoe, in contact with the ground, provides a wide base of support for the lower leg. Specifically, the hoof acts as a lever arm between the ground, in contact with the outer edges of the hoof or traditional shoe, and the lowermost joints of the leg, including the coffin joint and the pastern joint, to prevent inadvertent rolling of the hoof. The horse utilizes this leverage for locomotion in any direction, whether forward, backward, or sideways. A longer lever arm provides for more stability of the lower leg, while a shorter lever arm allows the hoof to more easily roll sideways or forward. Horses with pain in the hoof and lower leg joints, particularly due to lameness, such as navicular syndrome, can often find relief by rolling or breaking over the hoof, thereby changing the angle of the plane of the bottom of the hoof with respect to the ground. If a horse with such lameness were able to maintain the plane of the bottom of the hoof at a comfortable angle, this would increase blood circulation and promote healing in the hoof and associated bones and tissues. However, the stability provided by the wide base of the hoof makes this motion difficult or impossible to achieve when the horse's weight is loaded on the hoof.

Figure 1:
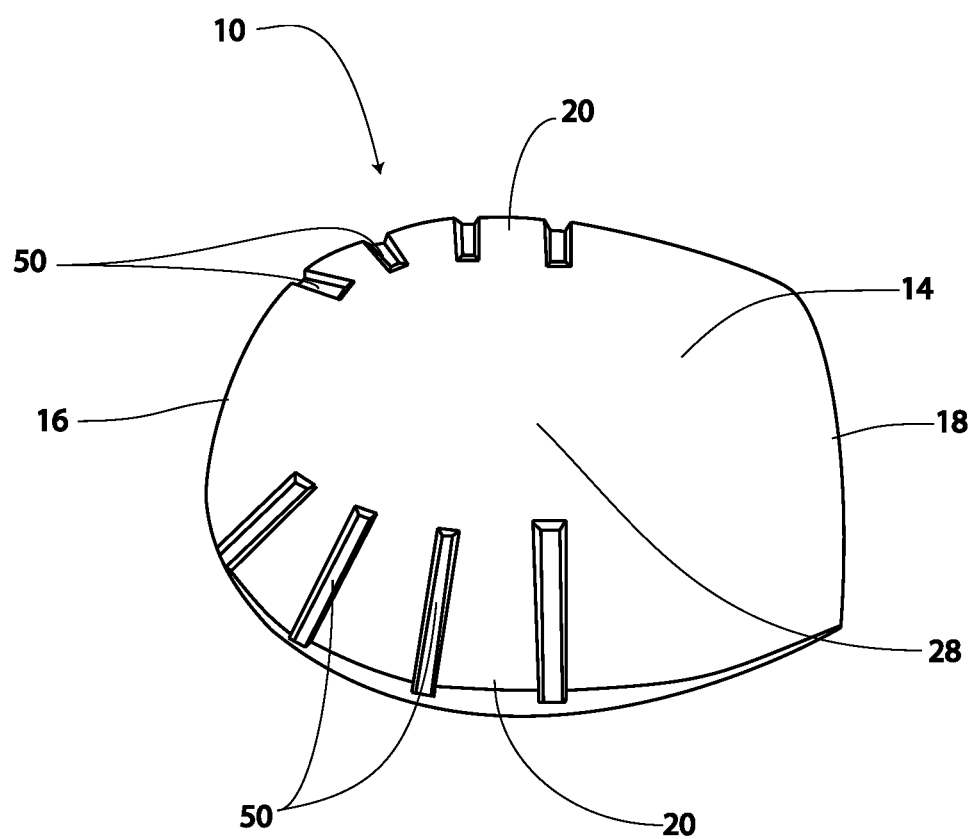
FIG. 1 is a perspective view of a therapeutic horseshoe according to an embodiment.
Figure 2:
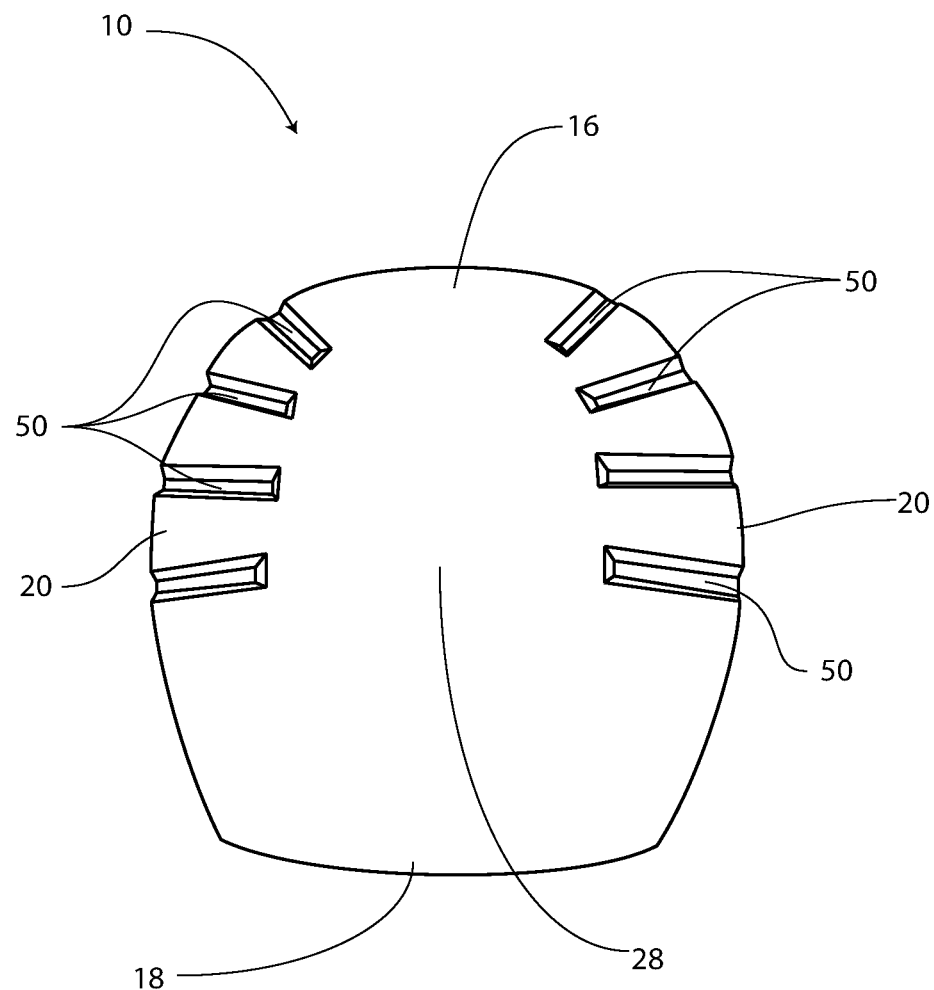
FIG. 2 is a bottom view of a therapeutic horseshoe according to the embodiment of FIG. 1.
Figure 3:
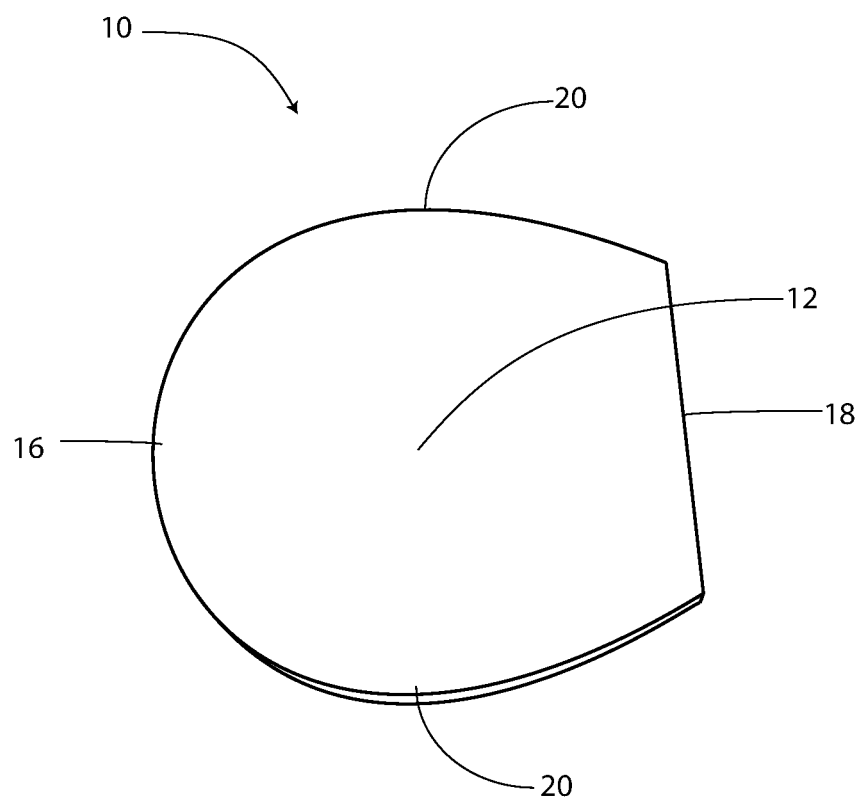
FIG. 3 is a top view of a therapeutic horseshoe according to the embodiment of FIG. 1.
Figure 4:
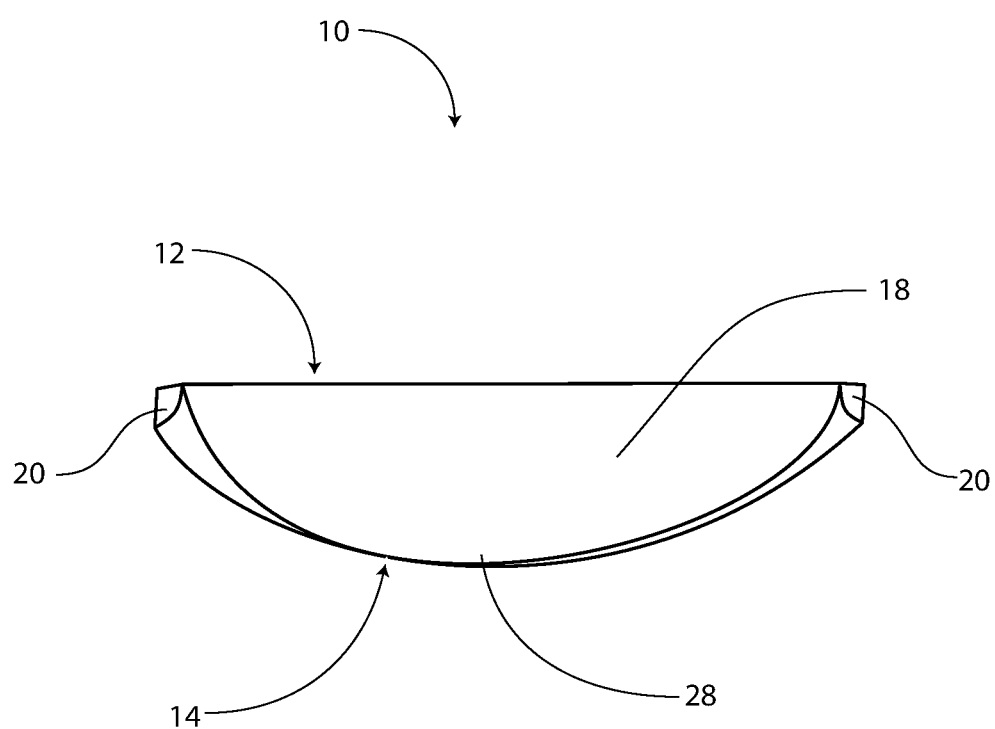
FIG. 4 is a rear view of a therapeutic horseshoe according to the embodiment of FIG. 1.
Figure 5:
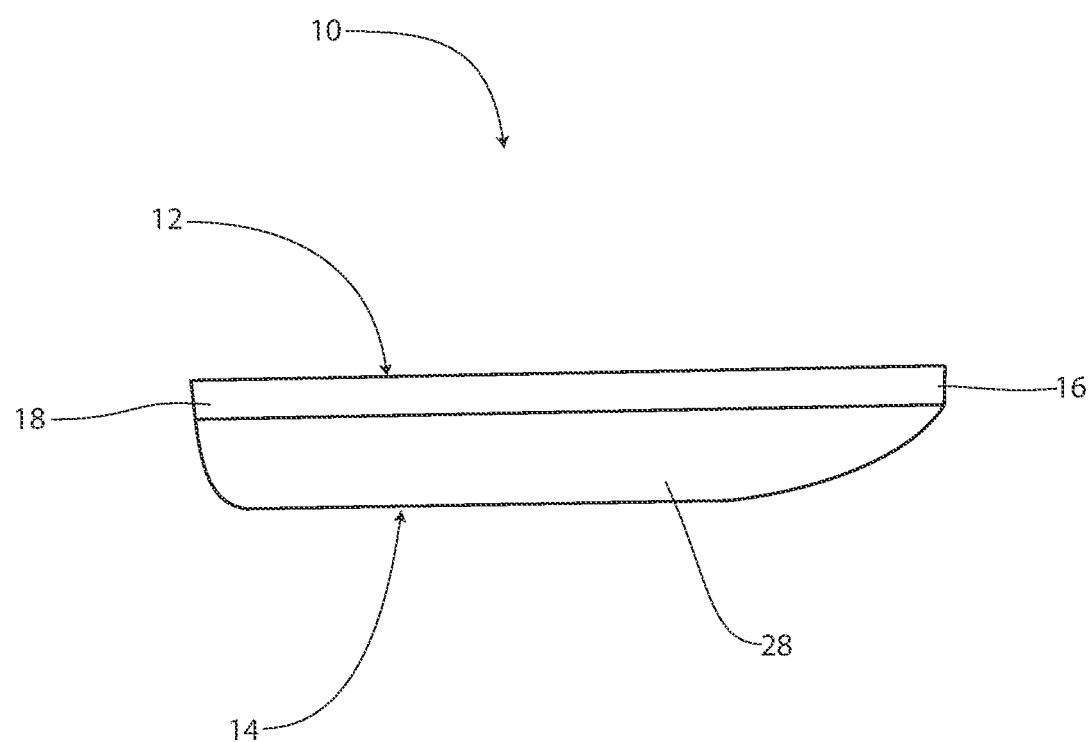
FIG. 5 is a side view of a therapeutic horseshoe according to the embodiment of FIG. 1.

As shown in FIGS. 1-5, a therapeutic horseshoe 10 of the present invention may comprise a unitary body having opposed upper surface 12 and lower surface 14 and, as viewed from the top as shown in FIG. 3, a generally rounded contour at the side portion 20 and toe portion 16 thereof, conforming to the shape of the bottom 24 of a wall 26 of a hoof 22 of a horse, and the contour being flat across the heel portion 18 thereof. The upper surface 12 may be flat and/or otherwise configured to engage the flat bottom 24 of the wall 26 of a hoof 22 of a horse when coupled thereto. Although the upper surface 12, as shown in FIG. 3 is flat, this is not intended to be limiting. In some embodiments, the upper surface 12 may have some concavity and/or a recess at the center 28 thereof. In any case, the perimeter is flat in order to conform to the shape of the bottom 24 of a wall 26 of a hoof 22 of a horse. The lower surface 14 may be curved, such that the horseshoe 10 is thicker in the middle and heel portions 28 and 18 thereof and thinner at the sides 20 and toe portions 16 thereof. When viewed from the rear, the contour of the lower surface 14 may be convex, wherein the horseshoe 10 is thicker in the middle portion 28 and thinner on the sides 20. When viewed from a side, the contour of the lower surface 14 may be flat, from the heel portion 18 to the middle portion 28 and then curved in a convex fashion from the middle portion 28 to the toe 16, wherein the horseshoe 10 is of substantially uniform thickness from the heel 18 to the middle portion 28 and thinner at the toe 16.

Figure 6:
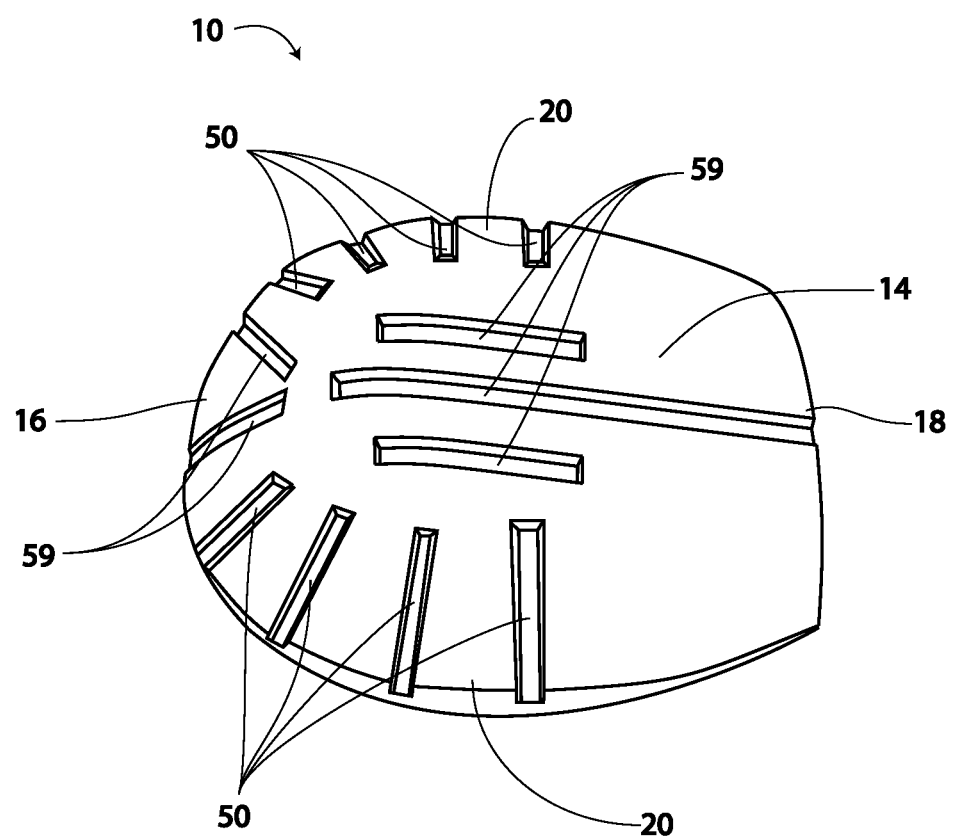
FIG. 6 is a perspective view of a therapeutic horseshoe according to an alternative embodiment.
Figure 7:
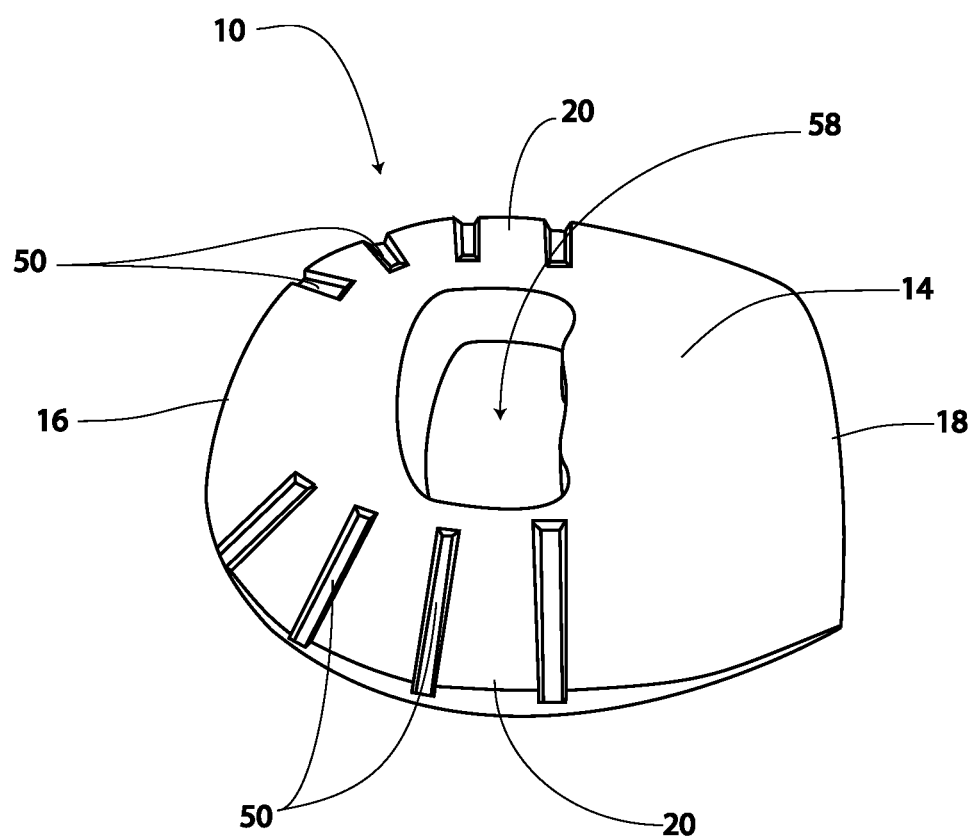
FIG. 7 is a perspective view of a therapeutic horseshoe according to another alternative embodiment.
Figure 8:
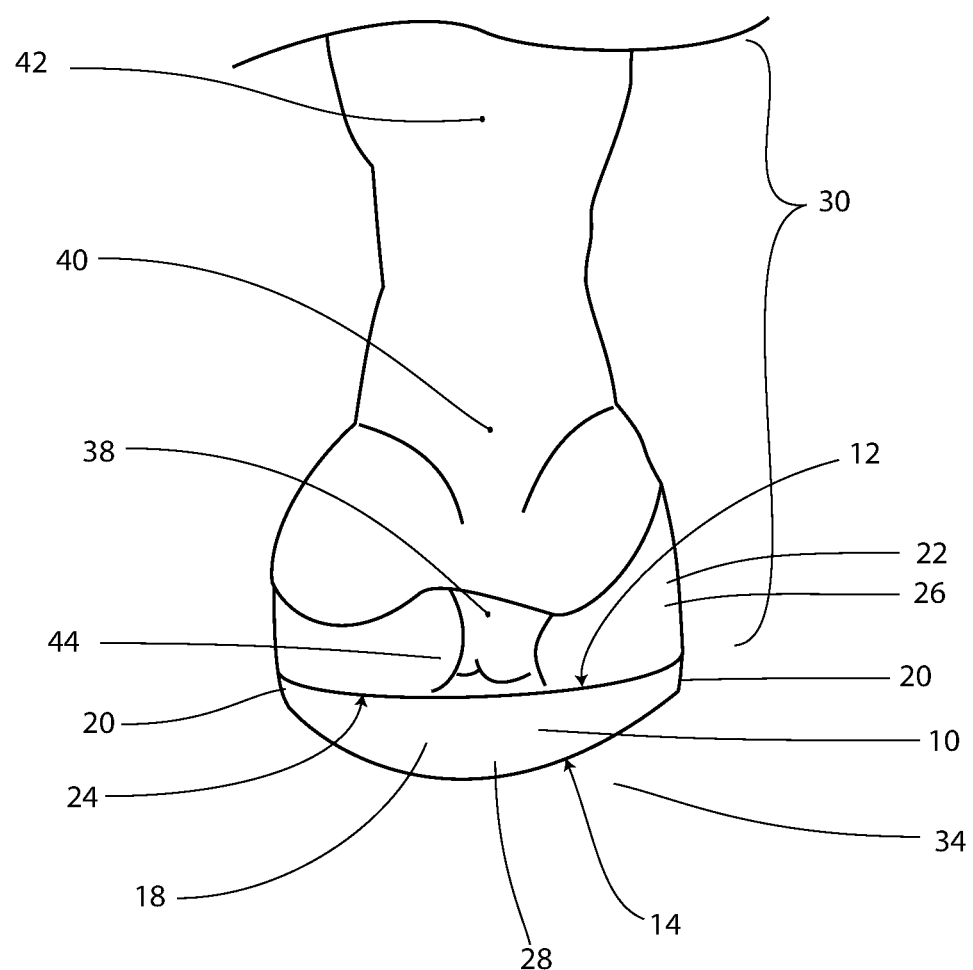
FIG. 8 is a caudal view of a lower leg of a horse shod with a therapeutic horseshoe according to an embodiment.

Some embodiments may comprise at least one traction element, such as at least one groove 59 in the lower surface 14, as shown in FIG. 6, or at least one aperture 58 through the therapeutic horseshoe 10, as shown in FIG. 7. Some embodiments may comprise at least one groove 59, at least one aperture 58, or any combination of at least one groove 59 and at least one aperture 58. The at least one traction element, as shown, provides additional traction for a horse, shod with a therapeutic horseshoe 10, during locomotion and does not otherwise affect the functionality of a therapeutic horseshoe 10 as described herein.

Figure 9:
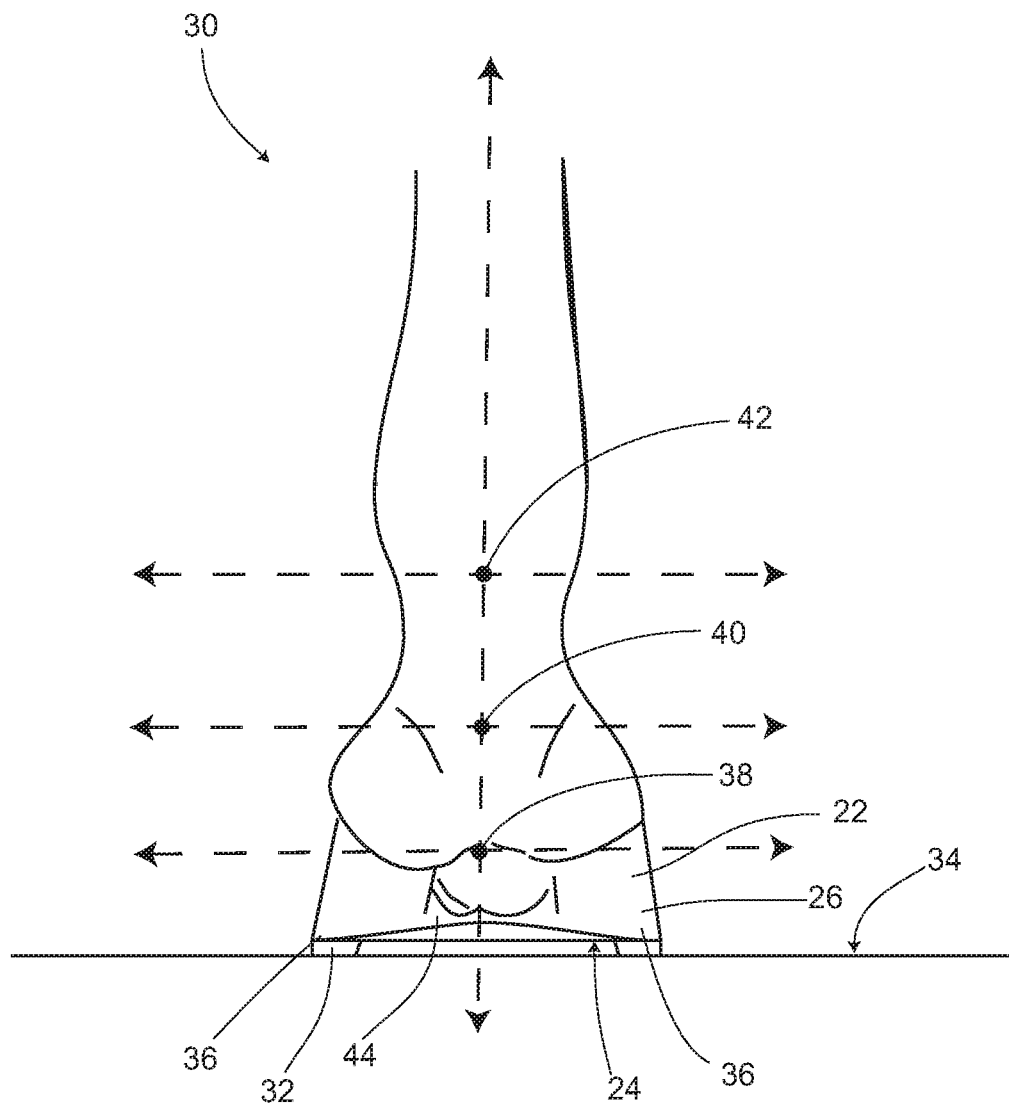
FIG. 9 is a caudal view of a lower leg of a horse shod with a traditional horseshoe.

Referring to the drawings, FIG. 9 is a caudal view of a lower leg 30 of a horse that is shod with a traditional horseshoe 32. As shown in FIG. 9, the traditional horseshoe 32 is in contact with the ground 34 directly below the outer edges 36 of the hoof 22, wherein the weight of the horse is transferred through the outer edges 36 of the hoof 22 to the ground 34. The hoof 22 thus shod with a traditional horseshoe 32 is laterally and medially stable.

Figure 10:
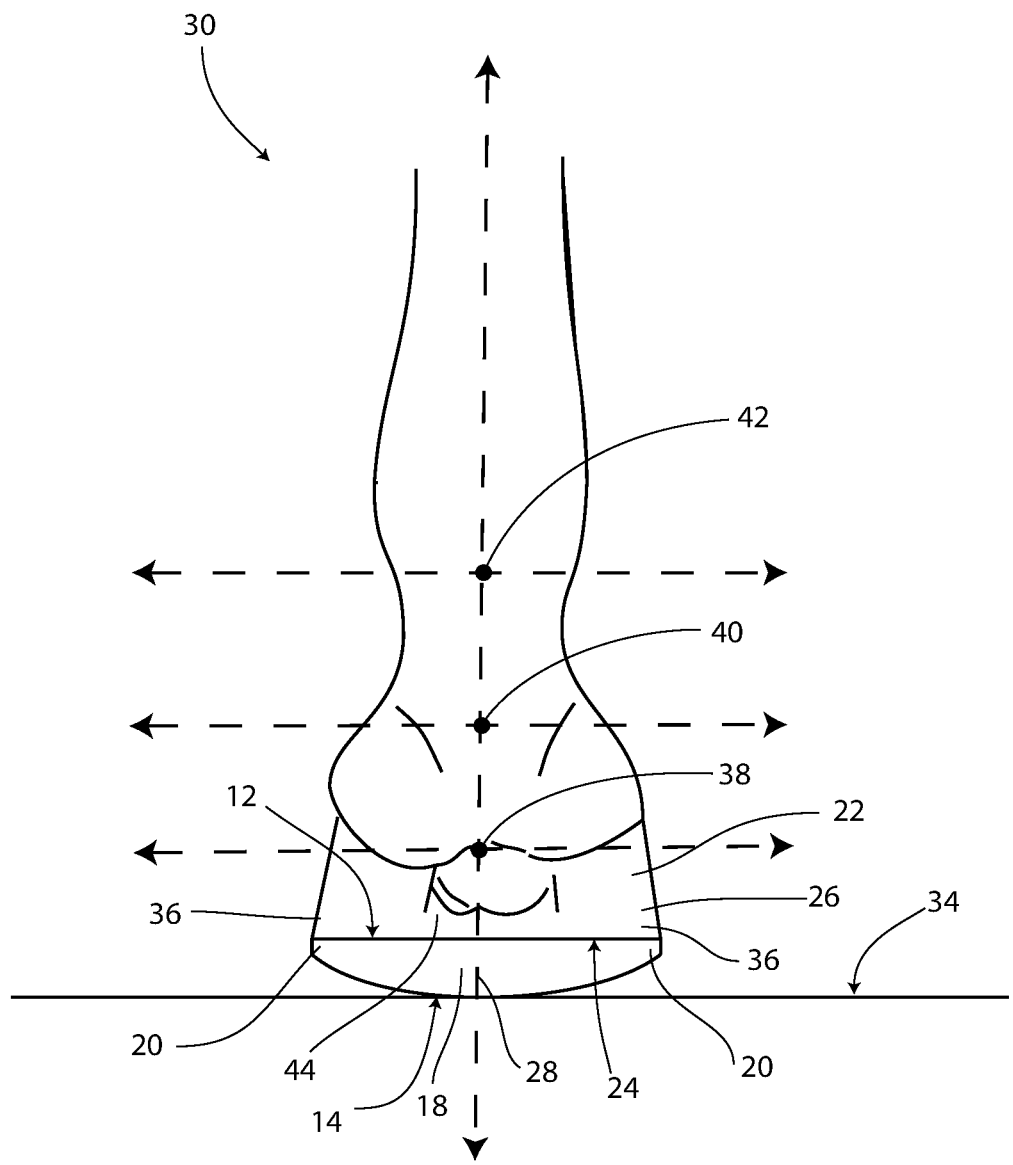
FIG. 10 is a caudal view of a lower leg of a horse shod with a therapeutic horseshoe according to an embodiment.
Figure 11:
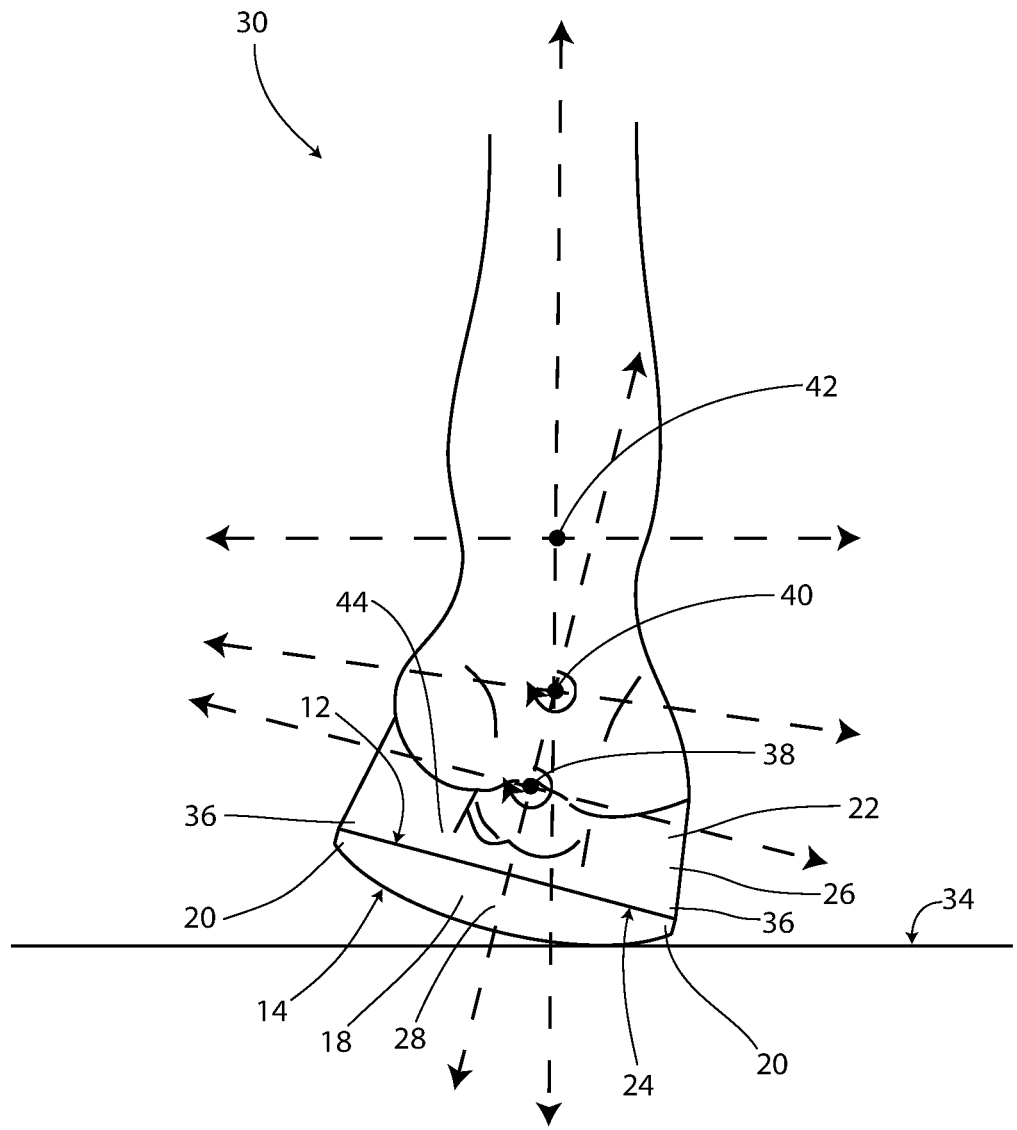
FIG. 11 is a caudal view of a lower leg of a horse shod with a therapeutic horseshoe, with the hoof rolled to the right by the horse, according to an embodiment.
Figure 12:
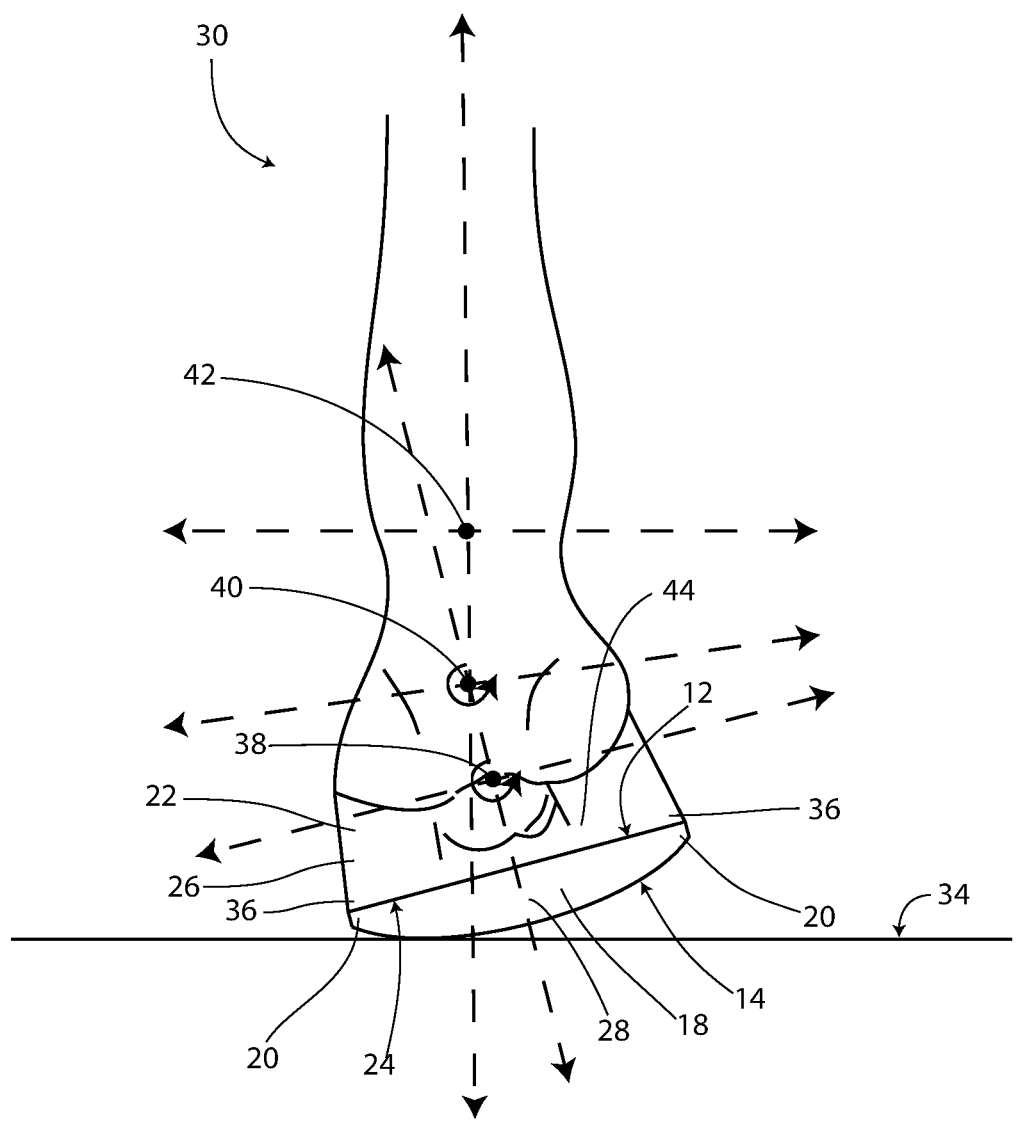
FIG. 12 is a caudal view of a lower leg of a horse shod with a therapeutic horseshoe, with the hoof rolled to the left by the horse, according to an embodiment.

FIGS. 8, 10-12 show a caudal view of a lower leg 30 of a horse that is shod with a therapeutic horseshoe 10 of the present invention. Referring to FIGS. 8, 10-12, because a therapeutic horseshoe 10 is thicker in the middle portion 28 and thinner on the sides 20, this allows a horse that is shod with a therapeutic horseshoe 10 to easily roll the hoof 22 laterally and medially to obtain comfort and pain relief. FIG. 10 shows a caudal view of a lower leg 30 of a horse shod with a therapeutic horseshoe 10 with the coffin joint 38, pastern joint 40 and fetlock joint 42 in vertical alignment, wherein the therapeutic horseshoe 10 is in contact with the ground 34 only along the center 28 of the lower surface 14 of the therapeutic horseshoe 10. The hoof 22 thus shod with a therapeutic horseshoe 10 of the present invention is unstable, thus allowing the horse to self-adjust the angle of the plane of the bottom 24 of the hoof 22 with respect to the ground 34 in order to find comfort and alleviate pain. FIG. 11 shows the hoof 22 being rolled by the horse to the right and FIG. 12 shows the hoof 22 being rolled by the horse to the left. It is understood that a horse shod with a therapeutic horseshoe 10 of the present invention is free to roll the hoof 22 to any angle within the range of angles between a first angle in which the right side 20 of the horseshoe 10 is in contact with the ground 34, as shown in FIG. 9, and a second angle in which the left side 20 of the horseshoe 10 is in contact with the ground 34.

Because a horse shod with a therapeutic horseshoe 10 of the present invention is able to self-adjust the angle of the hoof 22, the horse is thereby able to find comfort and relief from pain by doing so. This, in turn, may promote better blood circulation throughout the hoof 22 and the tissues of the lower leg 30 of the horse, relieve tension, and promote healing.

Figure 13:
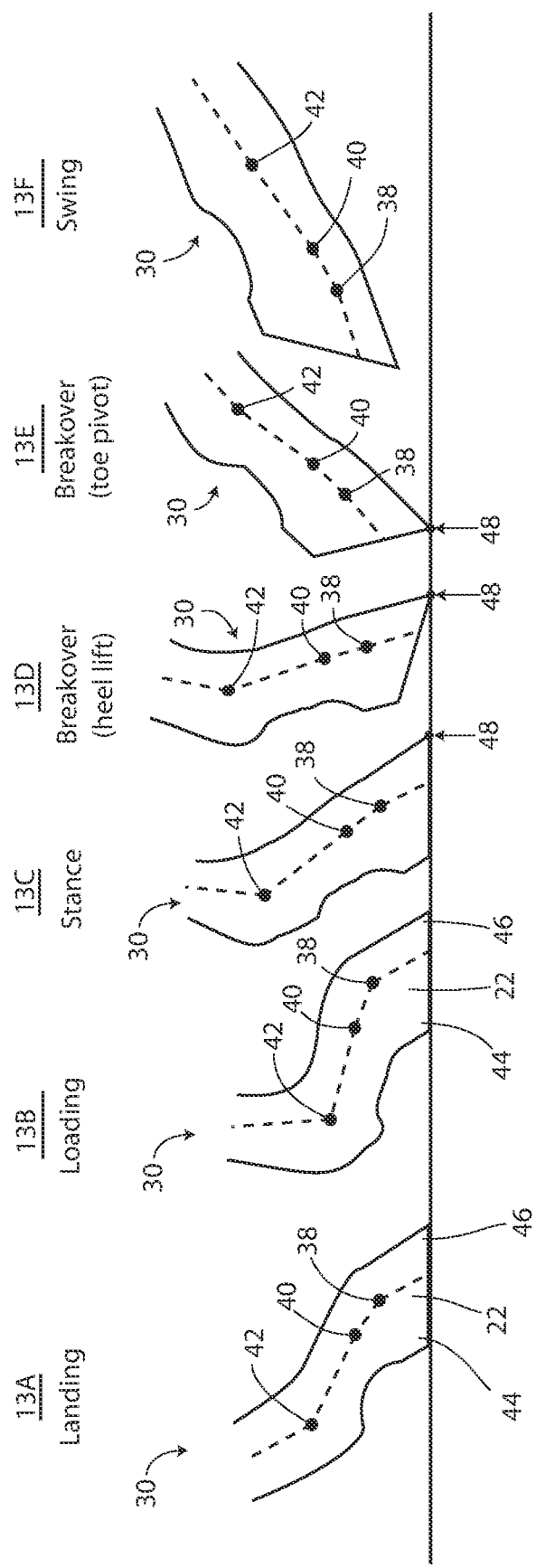
FIG. 13 is a series of diagrams illustrating a lateral view of the lower leg of a horse in successive stages of the horse's gait.
Figure 14:
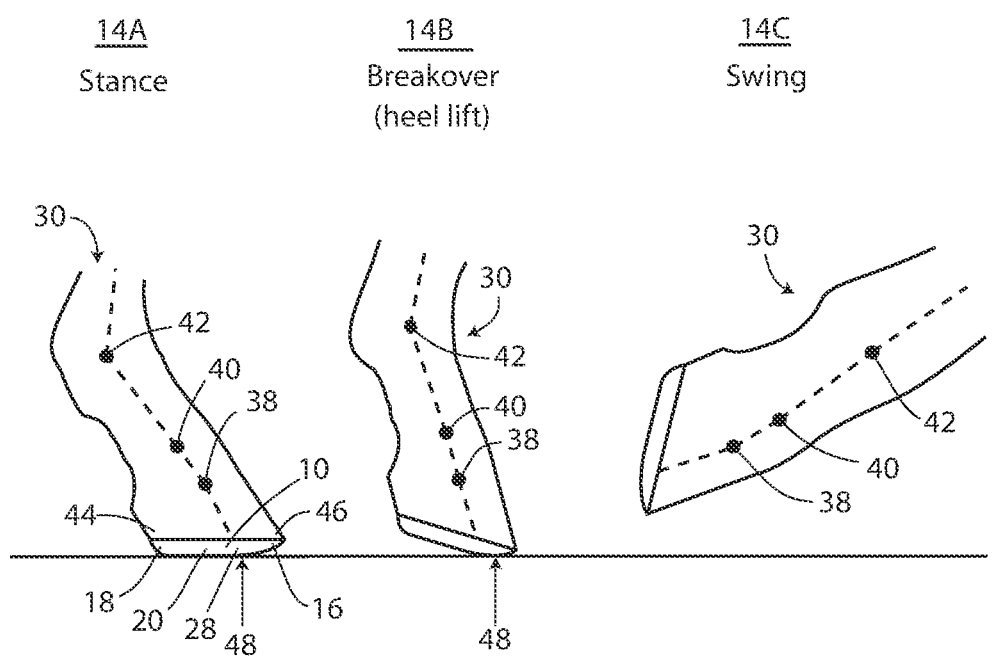
FIG. 14 is a series of diagrams illustrating a lateral view of the lower leg of a horse shod with a therapeutic horseshoe in successive stages of the horse's gait.

Referring again to the drawings, FIG. 13 is a lateral view of various successive stages of a horse's gait, including landing 13A, loading 13B, stance 13C, breakover (heel lift) 13D, breakover (toe pivot) 13E and swing 13F. Breakover is the stage in the gait at which the horse lifts the heel 44 of the hoof 22 and the hoof 22 pivots over the toe 46 of the hoof 22 before lifting the hoof 22 off the ground 34. The breakover point 48 of the hoof 22 is determined by the length of the toe 46 of the hoof 22 and is that point of the hoof 22 that is last in contact with the ground 34 before the hoof 22 is lifted off the ground 34. If the toe 46 of the hoof 22 is long, then breakover is delayed in the gait. If the toe 46 of the hoof 22 is short, then breakover occurs sooner in the gait. A strong and healthy horse may utilize a longer toe 46 to its advantage because the lever arm between the ground 34 at the point of contact 48 of the front of the toe 46 and the lower joints 38, 40, and 42 of the leg 30 is longer, resulting in a longer stride in the gait. However, if the toe 46 of the hoof 22 is too long, the added force necessary to breakover the hoof 22 can become injurious and/or painful to the muscles and tendons of the lower foot 30, particularly if the horse is not strong and/or healthy. Accordingly, shortening the length of the toe 46 of the hoof 22 has the effect of shortening the lever arm, reducing the force needed to breakover the hoof 22, and causing breakover to occur sooner in the gait. FIG. 14 is a lateral view of the stance 14A, breakover 14B, and swing 14C stages of the gait of a horse shod with a therapeutic horseshoe 10 of the present invention. As shown in FIG. 14, the lower surface 14 of the therapeutic horseshoe 10 may be rounded in a convex fashion near the front toe portion 16 thereof. As shown in the figure, the breakover point 48 may be set back a distance behind the toe 46 of the hoof. This causes breakover to occur earlier in the gait and reduces the force needed to breakover the hoof 22. The reduction in force needed to breakover the hoof 22 tends to alleviate stress in the muscles and tendons of the lower leg 30, which may result in increased blood flow, pain reduction, and healing.

Although a therapeutic horseshoe 10, as shown in the drawings, may have a lower surface 14 that is rounded in a convex fashion near the front toe portion 16 thereof, in order to set back the breakover point 48 a distance behind the toe 46 of the hoof, this is not intended to be limiting. In some embodiments, the lower surface 14 may not be rounded near the front toe portion 16 thereof, in which case, the breakover point 48 may be directly below the toe 46 of the hoof. In other embodiments, the front toe portion 16 of a therapeutic horseshoe 10 may extend a distance in front of the toe 46 of the hoof, such that the breakover point 48 is set forward a distance in front of the toe 46 of the hoof, causing breakover to occur later in the gait.

A therapeutic horseshoe 10 of the present invention may be attached to the hoof 22 of a horse by any suitable means, such as by nailing, screwing, use of adhesives, use of straps, or the like. A common means of attaching the shoe 10 is by nailing, using traditional horseshoe nails, as is common with traditional horseshoes 32. However, this is not intended to be limiting. As shown in FIGS. 1 and 2, embodiments of a therapeutic horseshoe 10 may comprise a plurality of grooves 50, recesses, markings, or a combination thereof, on the lower surface 14 thereof to indicate locations for nailing, or otherwise attaching, the horseshoe 10 to the hoof 22 of a horse. Such grooves 50 and/or recesses may also serve to provide added traction for the horse.

Figure 15:
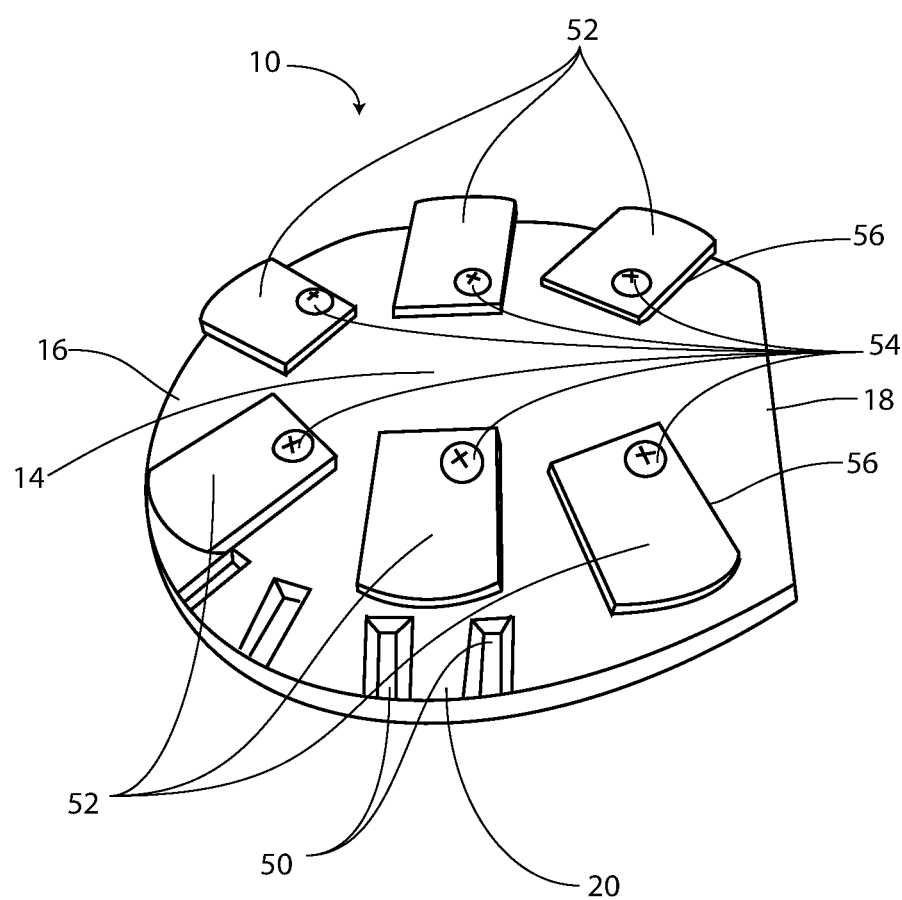
FIG. 15 is a perspective view of a therapeutic horseshoe according to an embodiment.

As shown in FIG. 15, some embodiments of a therapeutic horseshoe 10 of the present invention may comprise at least one tab 52 removably coupled to the lower surface 14 thereof. A tab 52 may be of any shape and of any size that is suitable for being coupled to the lower surface 14 of a therapeutic horseshoe 10. For example, FIG. 15 shows a therapeutic horseshoe 10 having six tabs 52 removably coupled to the lower surface 14 thereof. Such tabs 52 may be added or removed, in any combination. Where a tab 52 is coupled to the lower surface 14 of a therapeutic horseshoe 10, it provides a location of additional pressure to the bottom 24 of the horse's hoof 22, due to the added thickness of the horseshoe 10 at the location of the tab 52. In some embodiments, a tab 52 may also provide additional traction. Furthermore, tabs 52, in any combination, coupled to the lower surface 14 of a therapeutic horseshoe 10, may tend to limit or restrict lateral and/or medial rolling of the hoof. A farrier may thus be able to customize a therapeutic horseshoe 10, by coupling at least one tab 52, or combination of tabs 52, at strategic locations on the lower surface 14 of the horseshoe 10. In this manner, the farrier may be able to provide added pressure, and/or various levels of stability, to the bottom 24 of the hoof 22 of a horse, at strategic locations. The number and configuration of combinations of tabs 52 may be altered, in a modular fashion, without removing the therapeutic horseshoe 10 from the hoof 22. As shown in FIG. 15, a tab 52 may be coupled to the lower surface 14 of a therapeutic horseshoe 10 by at least one screw 54. In some embodiments, the head of the at least one screw 54 may extend below the tab, as shown. However, this is not intended to be limiting. A tab 52 may be coupled to the lower surface 14 of a therapeutic horseshoe 10 by any suitable means, such as by any combination of screws, nails, staples, adhesives, or the like. In some embodiments, such as is shown in FIG. 15, a therapeutic horseshoe 10 may comprise at least one tab recess 56 configured for partially receiving a tab 52 therein. The tab recess 56 may help to provide added security to the tab 52 by preventing rotation and/or movement of the tab 52 with respect to the horseshoe 10 when in use.

In practice, a horse with navicular syndrome may be shod with therapeutic horseshoes 10 of the present invention for an initial period of typically 1-3 months, for example, in order to increase blood flow, provide pain relief, and begin the initial healing stages. Then, as the horse begins to regain health and strength in the lower legs 30, the therapeutic horseshoes 10 may be removed and replaced with other traditional corrective shoes, providing more stability and leverage, until the horse more fully recovers.

Figure 16:
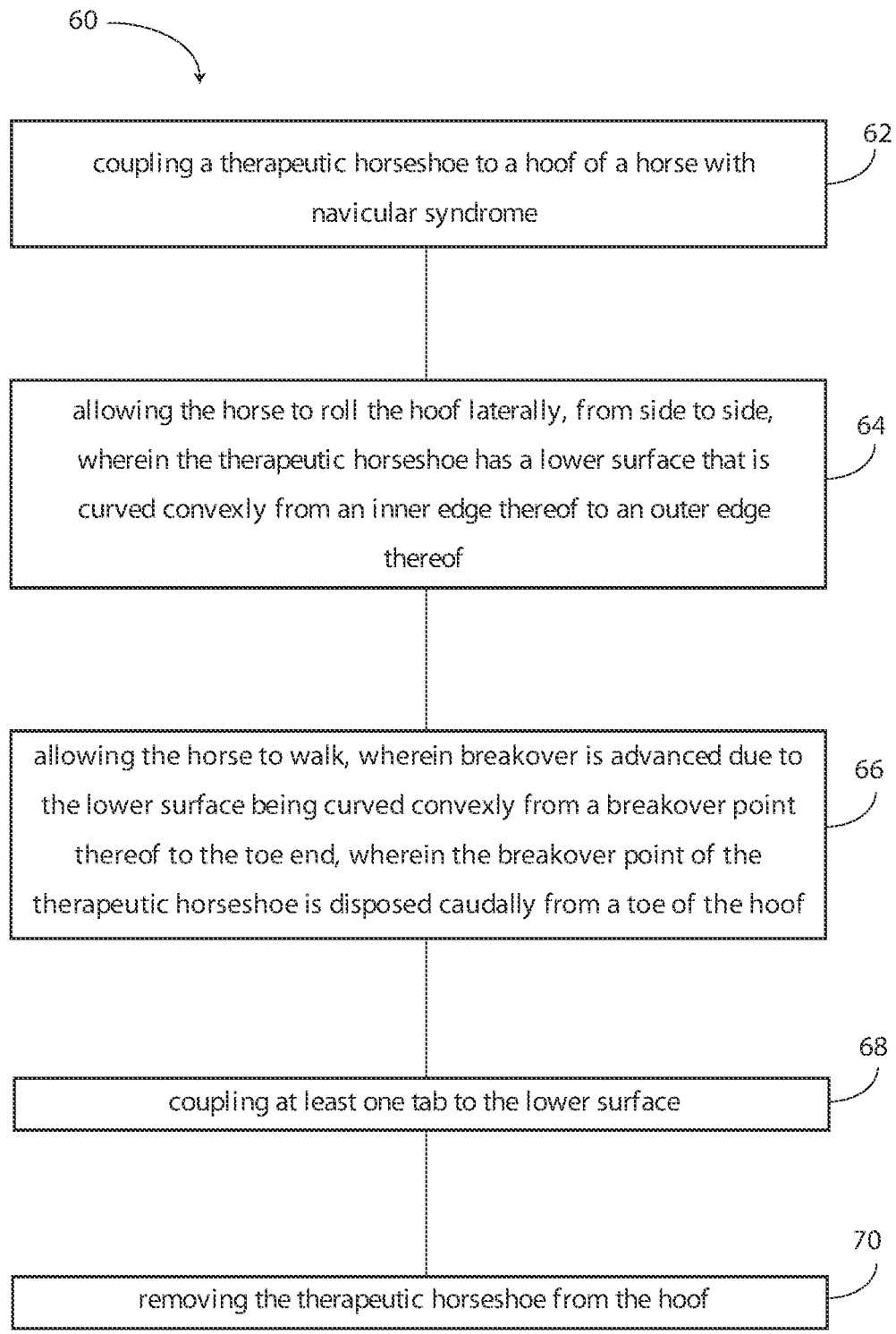
FIG. 16 is a block diagram of steps of a method of using a therapeutic horseshoe according to an embodiment.

FIG. 16 depicts steps of a method 60 of using a therapeutic horseshoe, comprising: coupling a therapeutic horseshoe to a hoof of a horse with navicular syndrome [Step 62]; allowing the horse to roll the hoof laterally, from side to side, wherein the therapeutic horseshoe has a lower surface that is curved convexly from an inner edge thereof to an outer edge thereof [Step 64]; and removing the therapeutic horseshoe from the hoof [Step 70]. As shown, the method 60 may further comprise allowing the horse to walk, wherein breakover is advanced due to the lower surface being curved convexly from a breakover point thereof to a toe end thereof, wherein the breakover point of the therapeutic horseshoe is disposed caudally from a toe end of the hoof [Step 66]. In addition, as shown, the method 60 may further comprise coupling at least one tab to the lower surface [Step 68].

The components defining any therapeutic horseshoe 10 may be formed of any of many different types of materials or combinations thereof that can readily be formed into shaped objects provided that the components selected are consistent with the intended operation of a therapeutic horseshoe 10. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any therapeutic horseshoe 10 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A therapeutic horseshoe, comprising:
    a main body of unitary construction of nondeformable material, the main body comprising:
        opposed upper and lower surfaces, wherein
            the upper surface is configured to engage a bottom of a hoof of a horse;
            the lower surface is flat from a heel end thereof to a breakover point between a center portion thereof and a toe end thereof, the toe end being disposed opposite the heel end; and
            the lower surface is curved convexly from an inner edge to an opposed outer edge;
        wherein the contour of the upper surface is rounded along the inner edge, the toe end, and the outer edge, corresponding to a shape of the hoof.

2. The therapeutic horseshoe of claim 1, wherein the lower surface is curved convexly from the toe end to the breakover point between the center portion thereof and the toe end.

3. The therapeutic horseshoe of claim 1, wherein the contour of the upper surface along the heel end is flat from the inner edge to the outer edge.

4. The therapeutic horseshoe of claim 1, wherein the lower surface comprises a plurality of grooves proximate the inner edge and the outer edge for indicating locations for nailing the horseshoe to the hoof.

5. The therapeutic horseshoe of claim 1, comprising at least one traction element selected from the group of traction elements consisting of at least one groove in the lower surface, at least one aperture through the therapeutic horseshoe, and a combination thereof.

6. A therapeutic horseshoe, comprising:
    a main body of unitary construction of nondeformable material, the main body comprising:
        opposed upper and lower surfaces, wherein
            the upper surface is configured to engage a bottom of a hoof of a horse;
            the lower surface is flat from a heel end thereof to a breakover point between a center portion thereof and a toe end thereof, the toe end being disposed opposite the heel end; and
            the lower surface is convex from an inner edge to an opposed outer edge;
        wherein the contour of the upper surface is rounded along the inner edge, the toe end, and the outer edge, corresponding to a shape of the hoof; and
        at least one tab removably coupled to the lower surface.

7. The therapeutic horseshoe of claim 6, wherein the lower surface further comprises at least one tab recess for receiving each of the at least one tab.

8. The therapeutic horseshoe of claim 7, wherein the at least one tab is removably coupled to the lower surface by a screw, wherein a head of the screw extends below the tab.

9. The therapeutic horseshoe of claim 8, wherein the number of tabs removably coupled to the lower surface is six.

10. The therapeutic horseshoe of claim 7, wherein the number of tabs removably coupled to the lower surface is six.

11. The therapeutic horseshoe of claim 6, wherein the lower surface is curved convexly from the toe end to the breakover point between the center portion thereof and the toe end.

12. The therapeutic horseshoe of claim 6, wherein the contour of the upper surface along the heel end is flat from the inner edge to the outer edge.

13. The therapeutic horseshoe of claim 6, wherein the lower surface further comprises a plurality of grooves proximate the inner edge and the outer edge for indicating locations for nailing the horseshoe to the hoof.

14. The therapeutic horseshoe of claim 6, comprising at least one traction element selected from the group of traction elements consisting of at least one groove in the lower surface, at least one aperture through the therapeutic horseshoe, and a combination of at least one groove in the lower surface and at least one aperture through the therapeutic horseshoe.

15. The therapeutic horseshoe of claim 6, wherein the number of tabs removably coupled to the lower surface is six.

16. A method of using a therapeutic horseshoe, comprising:
- coupling a therapeutic horseshoe to a hoof of a horse, wherein the therapeutic horseshoe comprises a main body of unitary construction of nondeformable material;
- allowing the horse to roll the hoof laterally, from side to side, wherein the therapeutic horseshoe has a lower surface that is curved convexly from an inner edge thereof to an outer edge thereof;
- wherein the lower surface is flat from a heel end thereof to a breakover point between a center portion thereof and a toe end thereof, the toe end being disposed opposite the heel end; and removing the therapeutic horseshoe from the hoof.

17. The method of claim 16, further comprising:
- allowing the horse to walk, wherein breakover is advanced due to the lower surface being curved convexly from the breakover point to the toe end.

18. The method of claim 16, further comprising:
- coupling at least one tab to the lower surface.

19. The method of claim 18, wherein the lower surface comprises at least one tab recess for receiving each of the at least one tab.

20. The method of claim 16, wherein the therapeutic horseshoe comprises at least one traction element selected from the group of traction elements consisting of at least one groove in the lower surface, at least one aperture through the therapeutic horseshoe, and a combination of at least one groove in the lower surface and at least one aperture through the therapeutic horseshoe.

* * * * *